(12) United States Patent
Albertson et al.

(10) Patent No.: US 10,603,594 B2
(45) Date of Patent: Mar. 31, 2020

(54) ONLINE ECOSYSTEM-BASED RESOURCE RECOMMENDATIONS

(71) Applicant: Microsoft Technology Licensing, LLC, Redmond, WA (US)

(72) Inventors: David Albertson, Bellevue, WA (US); Guillaume Jenkins, Redmond, WA (US); Samuel Des Rochers-Jetté, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 628 days.

(21) Appl. No.: 15/372,262

(22) Filed: Dec. 7, 2016

(65) Prior Publication Data
US 2018/0157981 A1  Jun. 7, 2018

(51) Int. Cl.
*A63F 13/795* (2014.01)
*H04L 29/08* (2006.01)
(Continued)

(52) U.S. Cl.
CPC ............ *A63F 13/795* (2014.09); *A63F 13/87* (2014.09); *G06N 3/006* (2013.01);
(Continued)

(58) Field of Classification Search
CPC .... A63F 13/795; G06N 5/04; G06Q 30/0201; G06Q 30/0282; H04L 67/22; H04L 67/306
See application file for complete search history.

(56) References Cited

U.S. PATENT DOCUMENTS

| | | |
|---|---|---|
| 7,614,955 B2 | 11/2009 | Farnham et al. |
| 8,342,967 B2 | 1/2013 | Thakkar et al. |

(Continued)

FOREIGN PATENT DOCUMENTS

WO   2016025449 A1   2/2016

OTHER PUBLICATIONS

Schlup, Christian, "Automatic Game Matching", Retrieved on: Aug. 11, 2016 Available at: http://dcg.ethz.ch/theses/ws0203/OnlineMatching_abstract.pdf.
(Continued)

*Primary Examiner* — Ronald Laneau
(74) *Attorney, Agent, or Firm* — Alleman Hall Creasman & Tuttle LLP (57) ABSTRACT

Examples are disclosed that relate to recommending resources accessible via an online ecosystem. One example provides a computing system including a logic machine and a storage machine holding instructions executable by the logic machine to, for each of a plurality of users of an online ecosystem, obtain and store interaction data regarding interactions of the user with one or more digital content items accessible via the online ecosystem, and receive a request associated with a selected user for a recommendation related to resources accessible via the online ecosystem. The instructions may be further executable to retrieve, for at least a subset of users of the plurality of users, the interaction data, apply a weighted matching algorithm to determine one or more similar users that are similar to the selected user, and output a recommendation for the selected user of one or more recommended resources accessible via the online ecosystem.

20 Claims, 5 Drawing Sheets

(51) Int. Cl.
*G06Q 30/02* (2012.01)
*A63F 13/87* (2014.01)
*G06N 3/00* (2006.01)

(52) U.S. Cl.
CPC ..... *G06Q 30/0201* (2013.01); *G06Q 30/0282* (2013.01); *H04L 67/22* (2013.01); *H04L 67/306* (2013.01)

(56) References Cited

U.S. PATENT DOCUMENTS

| | | | |
|---|---|---|---|
| 8,425,331 B2 | 4/2013 | Bortnik et al. | |
| 8,554,640 B1* | 10/2013 | Dykstra | G06Q 10/101 705/14.49 |
| 8,898,252 B2* | 11/2014 | McCaffrey | A63F 13/10 709/217 |
| 9,011,252 B2 | 4/2015 | Jennings et al. | |
| 9,734,453 B2* | 8/2017 | Kegel | H04N 21/4668 |
| 10,286,327 B2* | 5/2019 | Xue | A63F 13/35 |
| 2009/0075738 A1 | 3/2009 | Pearce | |
| 2012/0072382 A1 | 3/2012 | Pearson et al. | |
| 2012/0094762 A1 | 4/2012 | Khan | |
| 2014/0274362 A1 | 9/2014 | Dhawan et al. | |
| 2014/0274404 A1 | 9/2014 | Hoskins et al. | |
| 2016/0184706 A1 | 6/2016 | Muller | |

OTHER PUBLICATIONS

Deligkas, et al., "The Complexity of Weighted Greedy Matching", Retrieved on: Aug. 11, 2016 Available at: https://arxiv.org/pdf/1602.05909.pdf.

Li, Abner, "Play Games will now use unique Gamer IDs to represent users, claim yours today", Published on: Feb. 18, 2016 Available at: https://9to5google.com/2016/02/18/gamer-id-play-games/.

* cited by examiner

ONLINE ECOSYSTEM-BASED RESOURCE RECOMMENDATIONS

BACKGROUND

Many online games allow users to be selectively matched with one another for multiplayer game sessions. Matchmaking may be performed based upon various factors. For example, users may be matched with others of similar skill in the game and/or others with whom a user has previously established a relationship (e.g., friends and/or followers in the game).

SUMMARY

Examples are disclosed that relate to recommending resources accessible via an online ecosystem based upon ecosystem activities. One example provides a computing system comprising a logic machine and a storage machine holding instructions executable by the logic machine to, for each of a plurality of users of an online ecosystem, obtain and store interaction data regarding interactions of the user with one or more digital content items accessible via the online ecosystem. The instructions are further executable to receive a request associated with a selected user for a recommendation related to resources accessible via the online ecosystem, retrieve the interaction data for at least a subset of users of the plurality of users, apply a weighted matching algorithm to determine one or more similar users that are similar to the selected user, and output a recommendation for the selected user of one or more recommended resources accessible via the online ecosystem.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In many online gaming services, users are selectively matched to one another to facilitate multiplayer game sessions, as described above. To help match players that may enjoy playing together, users may be matched based upon skill level in the game and/or a previously established relationship.

However, such matchmaking may pose limitations. For example, matchmaking based upon a user's established social relationships and/or skill level may result in the user repeatedly being matched with a relatively small group of other players. This effect may be heightened based upon other factors used to prioritize matches, such as geographic proximity. Further, the data on which matchmaking for a particular game is based may be limited to users' interactions with that game specifically.

Accordingly, examples are disclosed that relate to recommending resources accessible via an online ecosystem via consideration of ecosystem-wide activities. For example, an online ecosystem may include an online gaining service that implements a plurality of games. In such an ecosystem, recommendations of other users with whom to play games, and/or other resources, may be based upon interactions of users with multiple games in the ecosystem, rather than just d actions with a particular game for which a recommendation is sought. In some examples, an ecosystem further may include other services, such as an application service, multimedia service, and/or productivity software service. In such examples, recommendations may be provided for digital content item such as movies, TV shows, music, and applications, as examples.

The disclosed examples for providing recommendations utilize data regarding interactions of users with the online ecosystem to identify similar users having similar interactions. As such, interaction data collected across a variety of interaction contexts (e.g., different devices, services, and/or types of content) in a non-intrusive manner may be used to provide relevant resource recommendations based upon similarities in user interactions across such contexts. The use of such data in the gaming context to provide recommendations of other players for matchmaking may help to surface a different and/or more diverse set of recommended other players than matchmaking based upon skill at a particular game and/or based upon previously established relationships. Further, as such interaction data reflects a user's up-to-date personal interaction patterns with the ecosystem, recommendations determined based upon such data may adapt to changes in user interaction over time, and thus may provide more persona zed recommendations than matchmaking based on game skills and/or relationships.

Figure 1A:
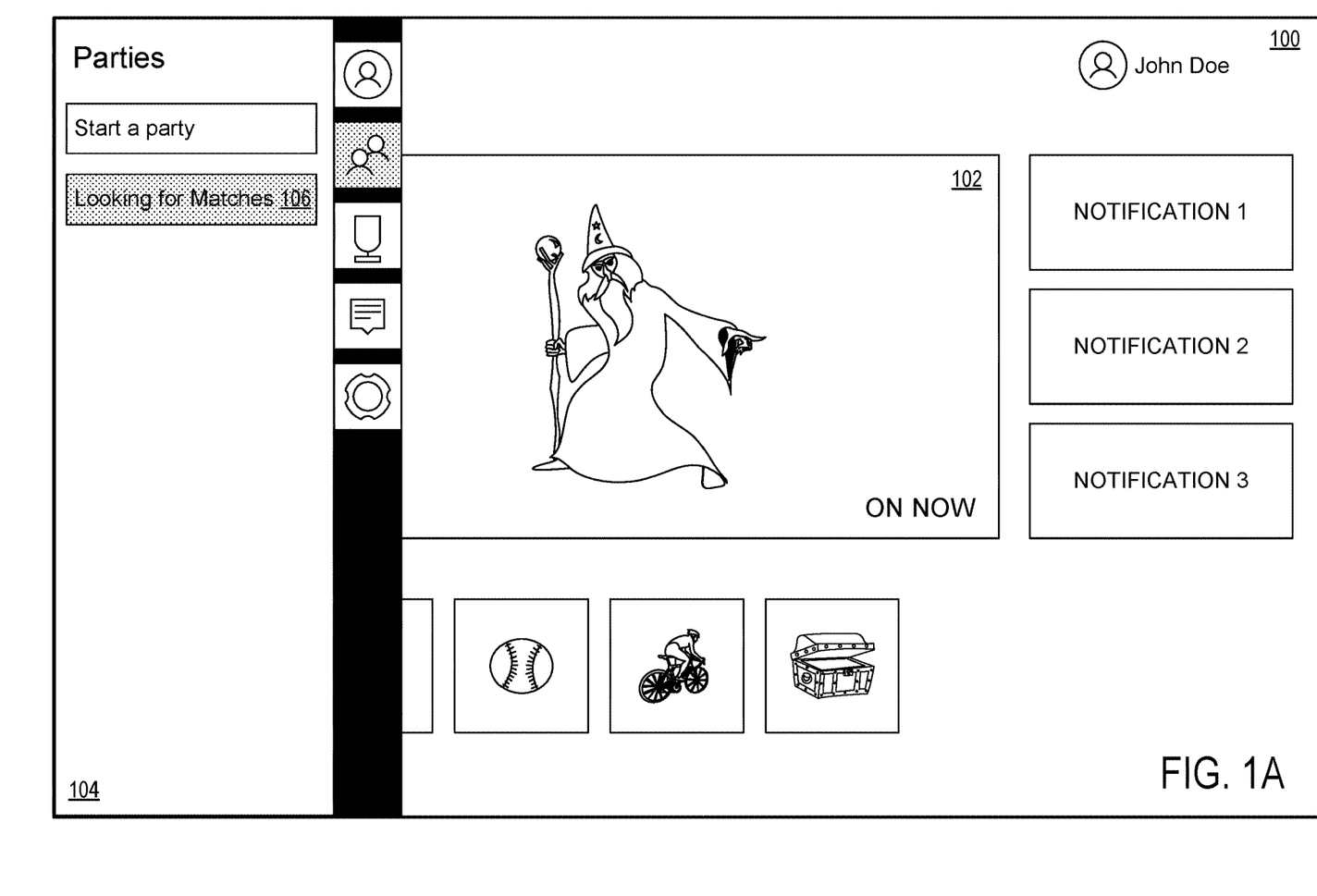
FIGS. 1A-1B respectively show example user interfaces operable to receive resource recommendations in an online ecosystem.

FIG. 1A shows an example user interface (UI) 100 operable to allow a user to request recommendations of resources. In the depicted example, UI 100 is a dashboard presented by an operating system executed on a game console computing device that subscribes, or is otherwise communicatively coupled, to an online gaming service. In other examples, user interfaces for requesting resource recommendations may be displayed in any other suitable context on any suitable computing device, including but not limited to desktop, laptop, tablet, mobile, and wearable computing devices. Example computing devices are described below with reference to FIGS. 2 and 4.

UI 100 includes a plurality of controls (e.g., control 102) selectable to effect computing device functions and various functions related to the online gaming service. As examples, the plurality of controls may be selectable to execute games and/or other applications, playback digital content items, display information regarding a user profile signed into the game console computing device, and/or display information regarding contacts of the user, among other potential functions. Additional control(s) may be provided at a menu 104, which is shown in FIG. 1A in an expanded state (e.g., in response to user selection of a control to expand the menu).

Menu 104 includes a control 106 selectable to send a request for a recommendation related to resources accessible via the online gaming service. In the depicted example, control 106 is selectable to send requests for matchmaking with other users of the online gaming service with whom to participate in an online game. In other examples, a user interface may include a control selectable to obtain recommendations of digital content or other items for consumption.

Figure 1B:
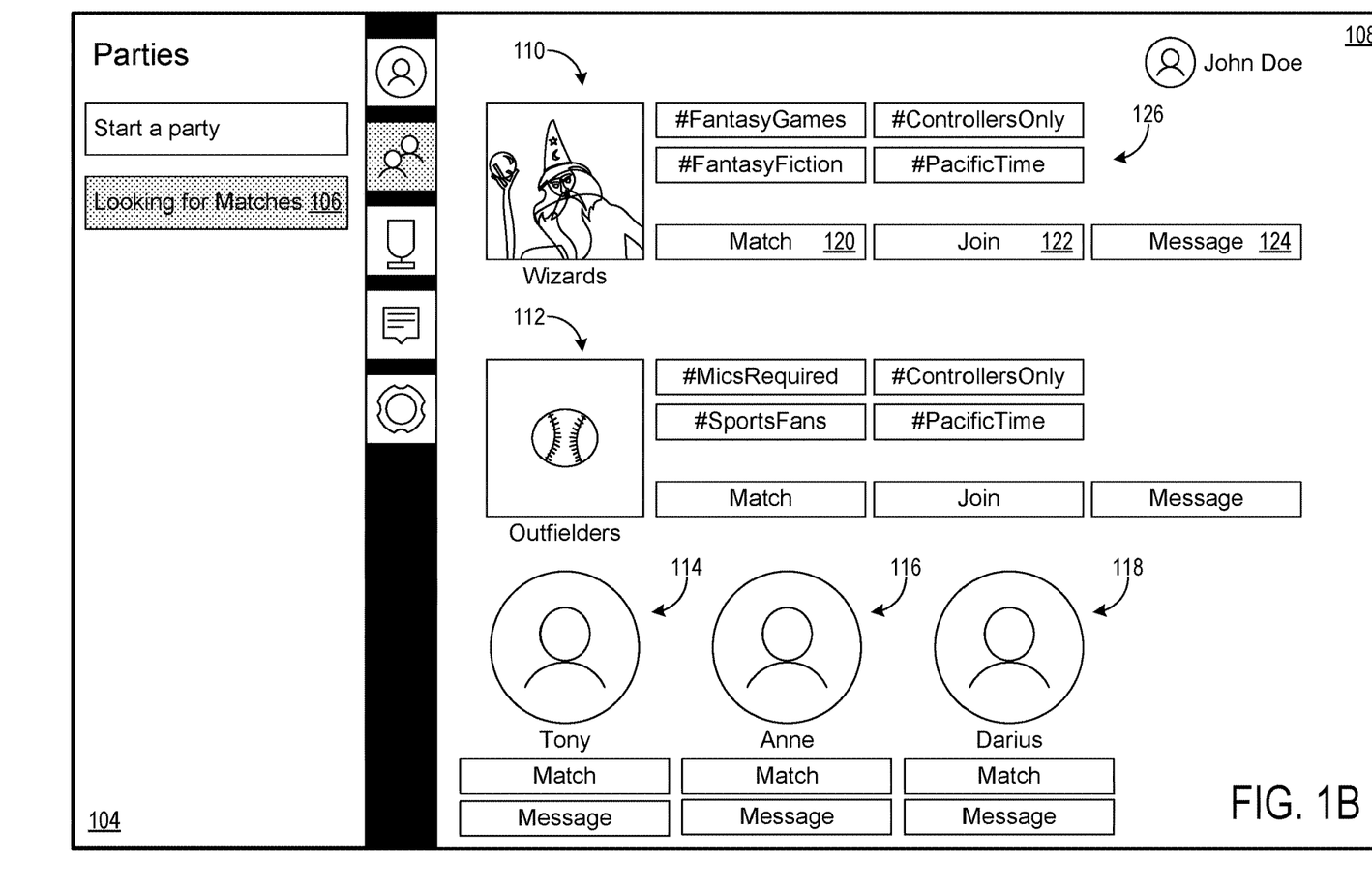

FIG. 1B shows an example UI 108 that may be displayed in response to selection of control 106 of FIG. 1A or a similar control. UI 108 displays other users of the online gaming service who are recommended to the signed-in user in response to selection of control 106. UI 108 may present recommended users in the form of groups, such as groups 110 and 112, each of which may comprise one or more recommended users. Alternatively or additionally, UI 108 may present recommended users individually, such as users 114, 116, and 118. As described in further detail below, the recommendations displayed in UI 108 may be determined by comparing interactions of the signed-in user with an ecosystem of the online g service to interactions of other users with the ecosystem.

UI 108 may further include various controls for each group 110 and 112. For example, as shown with regard to group 110, the UI 108 includes a control 120 selectable to request matchmaking with the group (e.g., for a game being played by one or more members of the group and/or the signed-in user, or a game selected by a user via suitable controls), a control 122 selectable to request membership in the group, and a control 124 selectable to send a message text, video, audio) to the group. UI 108 includes analogous controls for group 112. Further, controls selectable to request matchmaking and to send a message may be provided for recommended individual other users 114, 116, and 118, for example. While not depicted in FIG. 1B, UI 108 further may include one or more controls selectable to filter the recommendations displayed therein (e.g., to display results regarding a specific game).

The request for resource recommendations entered by a signed-in user is sent to a remote computing system, such as a game platform or other content platform, which sends recommendations in response based upon user interactions with an ecosystem including the platform. In various examples, the ecosystem may be limited to the platform itself, or may include other components, such as an application platform, a multimedia content platform, and a productivity software platform. In the example depicted in FIG. 1B, the recommendations obtained include groups 110 and 112, and users 114, 116, and 118. For example, the computing system may determine that users 114, 116, and 118 are similar to the signed-in user based on interaction data indicating that the similar and signed-in users have played a common game as a preferred game—e.g., as a result of the interaction data indicating the game being played at a high frequency, having the highest time played relative to other games, and/or being the most recently played game. As another example, the computing system may determine group 110 to have one or more similar users to the signed-in user based on interaction data indicating that the similar and signed-in users prefer two or more common games. Various types of interaction data may be evaluated by the computing system. Examples of interaction data are described below with reference to FIG. 2.

Continuing with FIG. 1B, group 110 is recommended based on interaction data indicating a shared interest between the group and the signed-in user in fantasy games. For example, group 110 and the signed-in user may prefer two or more of the same fantasy games. UI 108 further displays one or more tags that indicate properties (e.g., preferences, interests, disinterests) of the recommended users and/or groups, which may help convey criteria with which the recommendations were made. For example, tags 126 associated with group 110 include a "#FantasyGames" tag indicating the group's interest in fantasy games that is determined to be a similarity with the signed-in user. By considering interaction data tracked for users across multiple games, relevant matches may be identified that may be missed using game-specific and/or previously established relationship-based matchmaking.

In some examples, user-specific non-gaming interaction data may be used to determine recommendations of resources. Non-gaming data may comprise data indicating user preferences, habits, accessibility options, and/or biographical information, among other potential data. This is illustrated in FIG. 1B as tags for groups 110 and 112 indicating non-gaming properties of the groups that are used to match with the signed-in user—a "#ControllersOnly" tag indicates both the groups' and user's preference for the use of a game controller for playing online games (e.g., as opposed to other input devices such as a mouse and keyboard), a "#MicsRequired" tag indicates the preference of group 112 and the signed-in user for usage of a microphone during online games, and a "#PacificTime" tag indicates both groups' and the user's location in the PST time zone. The user-specific non-gaming data may be based on user input specifying at least a portion of the non-gaming data (e.g., user preferences, biographical information), and/or may be based on observed interaction patterns be the online gaming service (e.g., by observing the absence of a microphone).

As mentioned above, the online gaming service to which the game console computing device is communicatively coupled may be part of an online ecosystem that includes other services. In these examples, interaction data regarding users' interactions across multiple services may be leveraged to provide recommendations of other users with whom to play. This is illustrated in FIG. 1B as a "#FantasyFiction" tag for group 110 indicating a common interest between the group and the signed-in user in fantasy fiction multimedia content. For example, this common interest may be derived from interaction data indicating consumption in the online ecosystem of fantasy fiction multimedia content provided by a multimedia service that provides video (e.g., television shows and/or movies), audio (e.g., music, audiobooks, and/or podcasts), and/or other forms. As another example, FIG. 1B shows a "#SportsFans" tag for group 112 indicating a common interest between the group and signed-in user in sports. In this example, the common interest in sports may be derived from interaction data indicating purchase, installation, and/or usage of a sports application provided by an application service in the online ecosystem, as well as consumption of sports-related television shows, sporting events, and/or sports-related movies. An example online ecosystem comprising various services is described below with reference to FIG. 2.

Alternatively or in addition to recommending other users, the computing system may recommend other types of resources accessible via the online ecosystem. For example, in response to a recommendation request associated with a selected user, the computing system may recommend one or more digital content items identified based upon interaction data of one or more users determined to be similar to the selected user. Depending on the services available in the online ecosystem, recommended digital content item(s) may comprise an application, game, video file, audio file, and/or other suitable item. In the example depicted in FIG. 1B, the computing system may recommend one or more games identified in the interaction data regarding the recommended users, alternatively or in addition to recommending those users.

In some examples, the types of resources recommended may be selected according to the context in which they are determined—for example, an application context may determine the types of resources that are recommended, such that digital audio content items are recommended for a music application, digital video content items are recommended for a TV and/or movie application, and games are recommended for a game application. In other examples, recommendations may be for content to be consumed in other contexts. Further, while the example depicted in FIG. 1B illustrates the recommendation of similar users without regard to any particular game, in other examples user recommendations are provided within a specific game as part of its matchmaking functionality. For example, the game can use a recommendation service external to the game to determine recommendations, and then present the recommendations within the game. In this manner, the game may provide recommendations of other players that may not be found when the data for that game alone is considered. Such a recommendations service may likewise be utilized by a third party service provider, as described below with reference to FIG. 2.

The computing system may use interaction data to rank recommended groups and/or users in addition to selecting the groups and/or users for recommendation. For example, the computing system may rank group 110 higher than group 112 where interaction data regarding the signed-in user indicates a greater preference of the user for fantasy games and fantasy fiction multimedia content than for sports or usage of microphones during gameplay. Moreover, users 114 and 116 may be ranked higher than user 118 where interaction data indicates a greater similarity among users 114 and 116 and the signed-in user than between user 118 and the signed-in user. Still further, individual similarities and/or ranks of group members may be evaluated in any suitable manner to determine a collective similarity and/or rank of the group. As examples, the similarities and/or ranks of individual group members may be averaged, computed in a weighted average, and/or compared to thresholds.

While FIGS. 1A-1B illustrate the supply of recommendations in response to user selection of a control, other triggers for generating recommendations also may be used. As examples, recommendations may be triggered upon boot-up of the game console computing device, upon sign-in of a user profile, upon opening an application configured to output resource recommendations, and/or automatically upon detection of a similarity between users that exceeds a threshold. For implementations in which recommendations are triggered by events other than explicit user requests for recommendations, a control may be provided (e.g., in UI 108) that is selectable to enable or disable non-user-triggered recommendations.

Figure 2:
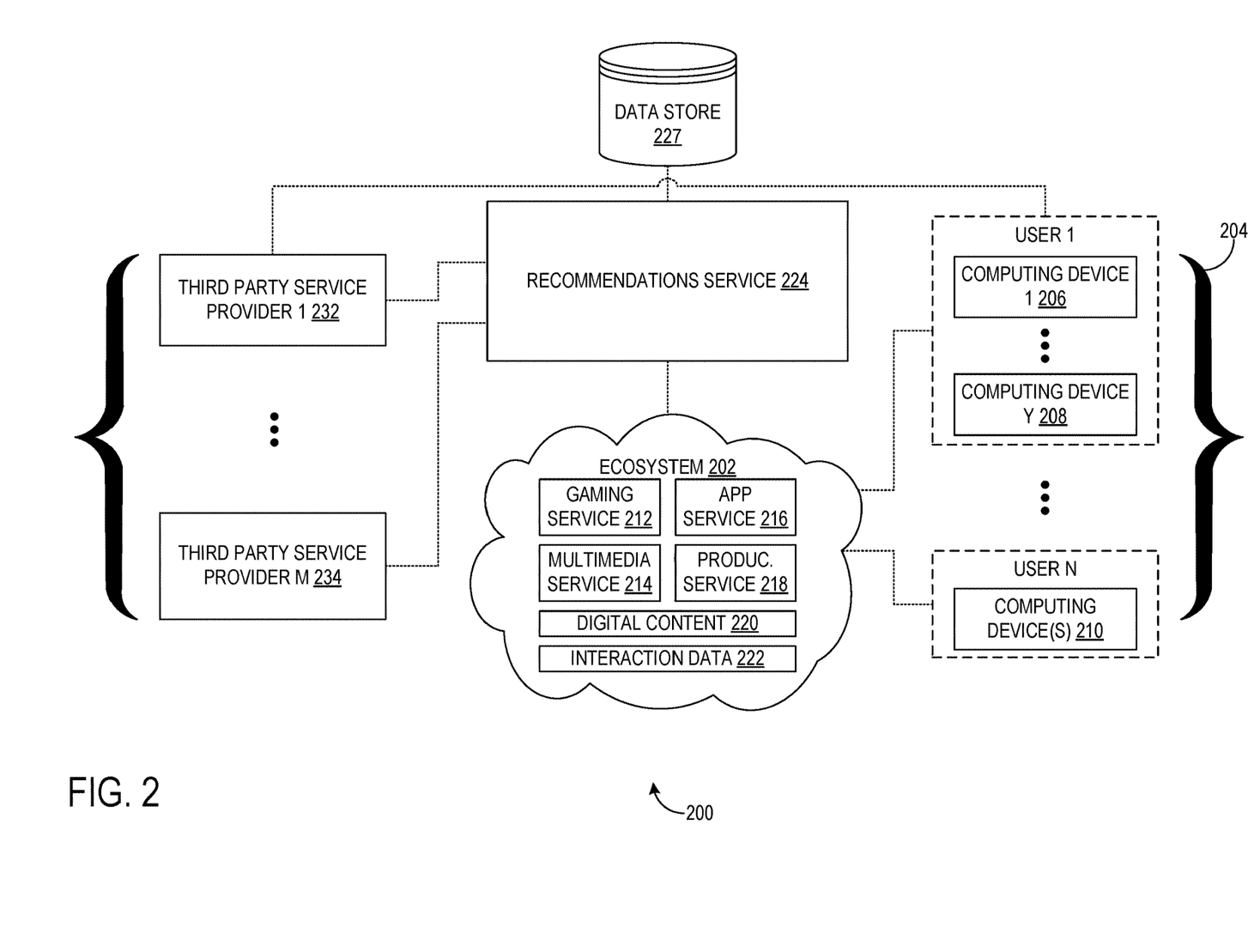
FIG. 2 shows an example computing environment in which resource recommendations may be provided.

FIG. 2 shows an example system 200 in which recommendations relating to resources accessible via an online ecosystem 202 may be supplied to users of the online ecosystem based upon interactions within the ecosystem. In system 200, a plurality of users 204 may interact with ecosystem 202 via one or more respective computing devices—as examples, FIG. 2 shows computing devices 206 and 208 associated with a first user and communicatively coupled to the ecosystem, and computing device(s) 210 associated with an nth user also communicatively coupled to the ecosystem.

The plurality of users 204 may have any suitable relationship(s) with ecosystem 202. For example, users 204 may subscribe to one or more services included in ecosystem 202, examples of which are shown in FIG. 2 as an online gaming service 212, a multimedia service 214, an application service 216, and a productivity software service 218. Gaming service 212 may facilitate various functions, such as matchmaking for online game(s), hosting of online game(s), communication and social networking among users, provision of a digital storefront (e.g., for distributing games and game-related content), and/or other potential functions. Multimedia service 214 may facilitate various functions, such as hosting or otherwise providing digital content items in various forms, such as video (e.g., as a TV show and/or movie service), audio as a music, audiobook, and/or podcast service), and/or other forms for user consumption via streaming and/or download). Application service 216 may provide functions such as hosting (e.g., as a digital application storefront) or otherwise providing applications for user consumption (e.g., via execution on user computing devices), among other potential functions. Productivity service 218 may provide functions such as hosting (e.g., as a digital application storefront) or otherwise providing (e.g. via download) productivity-related applications for user consumption, providing digital productivity-related services (e.g., data storage, data processing), among other potential functions. Via these services and/or potentially others, a user may access a plurality of digital content items via ecosystem 202, indicated by digital content 220. Digital content 220 may be hosted on any suitable storage local to ecosystem 202 or external to the ecosystem 220.

The interactions of the plurality of users 204 with ecosystem 202, and with the services and digital content therein, may be recorded (e.g. via telemetry performed by the ecosystem, by services within the ecosystem, and/or by other components in the ecosystem) in the form of interaction data 222. Interaction data 222 may thus comprise, for a given user of the plurality of users 204, data regarding the user's ecosystem interactions as carried out on one or more computing devices, and/or data regarding the user's interactions with one or more of gaming service multimedia service 214, application service 216, and productivity service 218.

With regard to game-related data, the interaction data may comprise data regarding gaming-related habits and preferences of users. In some examples, the gaming-related data may comprise device-specific data, such as data specific to a type of computing device (e.g. a game console, a mobile device, a wearable device, etc.). As illustrative examples, the gaming-related data may comprise, for a given user, a total time spent playing games (for all time or within a recent time period), times spent playing individual games, time spent playing games on specific devices, and a total score associated with the user (e.g., a score that numerically summarizes the user's achievements in his or her games played or otherwise relates to his or her gaming-related activity). Further, the gaming-related data may comprise data regarding user accessibility settings or preferences—e.g., for a given user, whether or not the usage of a microphone is preferred during gameplay of an online game.

Interaction data 222 may further comprise social-related data, which may or may not also be game-related. As examples, the social-related data may comprise, for a given user, a total number of contacts made within gaming service 212 and/or other service, a social graph, data relating to communication with the contacts e g., a number of messages sent by the user to contacts), and/or other social-related data, such as data regarding the user's profession. In some implementations. related data may be obtained from a social networking service in ecosystem 202 and/or remote from the ecosystem.

Interaction data 222 may further comprise non-gaming data. For example, the non-gaining data may regard user consumption of multimedia. As illustrative examples, the non-gaming data may comprise, for a given user, data relating to the user's preferred or favorite music. TV shows, and/or movies; data related to preferred or favorite musical, television, and/or movie genres; and data related to most consumed music, TV shows, and/or movies. Non-gaining data regarding multimedia consumption may be collected at multimedia service 214, for example. Further, the non-gaming data may comprise data regarding application usage, such as user application usage statistics. Non-gaming data regarding application usage may be collected at application service 216, for example.

Non-gaming data may comprise user-related data irrespective of interactions with ecosystem 202. For example, the user-related data may comprise, for a given user, his or her age or age group, gender, and region (e.g., ZIP code, IP address geolocation, country).

In view of the above, interaction data 222 may provide a diverse dataset with which insight into users' preferences, habits, and the like may be obtained for providing recommendations of recourses available on the ecosystem.

Recommendations may be identified based on interaction data 222 by determining other user similar user(s). This may help to identify recommendations of relevance to a requesting user, which may facilitate the provision of an enjoyable user experience and potentially the establishment of relationships with other users with whom a common interest is shared.

System 200 comprises a recommendations service 224 that is generally operable to determine and output resource recommendations to ecosystem 202 for provision to the plurality of users 204. To this end, recommendations service 224 may comprise one or more computing devices comprising logic and storage holding instructions executable via the logic to effect the approaches described herein. Example logic and storage devices are described below with reference to FIG. 4. While shown separately from the ecosystem in FIG. 2, the recommendations service 224 may be hosted by a same entity as ecosystem 202, and may logically be incorporated into ecosystem 202.

Recommendations service 224 may comprise instructions executable to obtain and store, for each of the plurality of users 204, interaction data 222 regarding interactions of that user with one or more digital content items of digital content 220 accessible via ecosystem 202. In some examples, stored interaction data 222 for a given user may be aggregated across two or more services and/or computing devices, as the user's interaction data may be distributed across multiple user profiles.

Stored interaction data 222 may comprise, for each of the plurality of users 204, a plurality of attributes regarding that user. Each attribute may relate to a specific aspect of the user's interaction with ecosystem. 202, and may include one or more of the examples of gaming-related, social-related, non-gaming, and/or other user-related data described above, such as a preferred or favorite multimedia genre, content item, game, application, artist, accessibility setting, etc. The plurality of attributes for the plurality of users 204 may be arranged in any suitable data structure. As examples, the plurality of attributes may be arranged in a table or database with each row corresponding to a user and each column corresponding to an attribute. As described in further detail below, one or more attributes associated with a selected user that are regarded as indicative of that user's preferences, habits, and the like may be compared with the same set of attributes of other users to identify similar users and to provide recommendations to the selected user based on interaction data 222 associated with the identified similar users.

The instructions in recommendations service 224 may be further executable to receive a request associated with a selected user for a recommendation related to resources accessible via ecosystem 202, and in response to receiving the request, retrieve interaction data 222 for at least a subset of users of the plurality of users 204. The request may comprise an identifier of the selected user and/or a security token, one or both of which may be specific to ecosystem 202 and/or one or more of services 212, 214, 216, and 218. The subset of users may be selected in any suitable manner. In some examples, the subset of users may belong to a cluster of the plurality of users 204 that share an attribute with the selected user, such as a country and/or language. Moreover, two or more attributes may be applied to select the subset of users, which may be chosen concurrently or successively. As a more specific example, a first subset of users may be selected that reside in the same country as the selected user, and the first subset may be filtered to form a second subset of users by discarding users of the first subset who have been inactive in ecosystem 202 for more than seven days.

Recommendations service 224 may comprise instructions executable to apply a weighted matching algorithm to determine one or more similar users of the subset of users that are similar to the selected user. Applying the weighted matching algorithm may comprise applying respective weights to at least a subset of the plurality of attributes to form a weighted subset of attributes, and comparing the weighted subset of attributes to the e subset of attributes associated with the selected user. In one example, the subset of attributes may be compared by performing substring matching. Substring matching may be implemented with any suitable algorithm. As examples, one or more of the following algorithms may be used to implement substring matching: the Knuth-Morris-Pratt algorithm (e.g., used for prefix-first matching), the Boyer-Moore algorithm, (e.g., used for postfix matching), and the Rabin-Karp algorithm. For examples in which at least a portion of strings considered in comparing the subset of attributes are constructed linearly, postfix matching (e.g., implemented via the Boyer-Moore algorithm) may increase the speed of string matching—e.g., an initial set of strings may be similar for most users, while the latter portions of relatively large and concatenated strings may often differ among users.

The weights employed by the weighted matching algorithm may be selected in any suitable manner. in some examples, the weights may be selected or influenced by user input. For example, the user input may indicate a set of attributes considered most important or relevant by a user for receiving recommendations. A suitable user interface may be provided (e.g., in menu 104 of FIG. 1B) for receiving such user input. As examples, a user may indicate via user input that a set of preferred or favorite games, users in a common age group, and/or that usage of a microphone being not required (e.g., if the user is hearing-impaired) is most important for matching. Weights also may be applied based upon factors determined to lead to relevant matches. For example, a higher weight may be applied to the games most played by a user, and a lower weight may be applied to the user's geographical location. In this example, the weighted matching algorithm may be applied such that similar users who share the three most played games are identified, and so that the algorithm preferentially selects users that share the same geographical location over those that do not, regardless of whether the users in the same geographical location share the three most played games.

The weights employed by the weighted matching algorithm further may be adjusted, either manually or automatically over time, based on the outcome of recommendations performed using the weights. For example, the weights may be adjusted in response to user input requesting or declining to access a recommended resource. As an more specific example with reference to FIG. 1B, selection of control 120 or 122 may be interpreted as a user input indicating an inclination of the signed-in user to access the recommended resource (e.g., group 110). In response, highly weighted factors may be weighted even more highly, or otherwise not adjusted. Likewise, a user input declining access to a recommended resource may lead to a reduction of weights of highly weighted factors. In some implementations, the outcomes of recommendations (e.g., user requests to access or decline recommended resources) may be used as input to machine learning algorithm(s) and/or artificial intelligence engine(s) configured to adapt weights and/or the weighted matching algorithm.

Recommendations service 224 may be further executable to output a recommendation of one or more recommended resources accessible via ecosystem 202, based at least in part on determining the one or more similar users via the weighted matching algorithm as described above. The one or more recommended resources may comprise one or more recommended other users with whom to participate in an online interactive activity (e.g., online game), such as groups 110 and 112, and users 114, 116, and 118 of FIG. 1B. The one or more recommended resources may alternatively or additionally comprise one or more digital content items recommended for consumption, such as digital content items selected from digital content 220. As described above, recommended digital content item(s) may be those identified in interaction data 222 with which the one or more similar users interacted. Further, the output recommendation may be accompanied by information describing criteria on which the recommendation was determined. Referring briefly again to FIG. 1B, recommended groups 110 and 112 are accompanied by one or more tags that indicate criteria with which the recommendation of the groups was made. Still further, the output of the recommended resource(s) may comprise a ranking of the recommended resource(s). Again with reference to FIG. 1B, group 110 may be ranked higher than group 112, and user 114 may be ranked higher than users 116 and 118, as the higher ranked group and user are determined to be of relatively greater similarity to the signed-in user.

Recommendations service 224 may comprise instructions executable to obtain interaction data 222 from ecosystem 202 and to store the obtained interaction data at a data store 227 communicatively coupled to the recommendations service. Data store 227 may be hosted along with recommendations service 224 by a common entity or remote from the recommendations service. Further, the interaction data 222 stored at data store 227 may be updated. For example, recommendations service 224 may obtain from ecosystem 202 and store interaction data 222 at regular (e.g., daily, weekly, monthly) and/or random intervals, and/or in response to any suitable trigger, such as receiving a recommendation request associated with a user. By updating stored interaction data 222, recommendations service 224 may determine up-to-date recommendations that adapt to changing user interactions with ecosystem 202 as they are reflected in the interaction data In addition to providing recommendations from services of the ecosystem 202, in some examples, the recommendations service 224 may provide recommendations for third party services. FIG. 2 shows a first third party service provider 232 and an mth third party service provider 234 communicatively coupled to recommendations service 224. Third party service provider 232 is further illustrated as communicatively coupled to first user (e.g., via one or both of computing devices 206 and 208), for example via a network also used to communicatively couple to ecosystem 202. As a more specific example, third party service providers may comprise e-commerce websites, video/music/game providers, application providers, and/or any other suitable content provider outside of ecosystem 202. In the specific example of third patty service provider 232 being an e-commerce website, user 1 may request recommendations for products offered by the third party service provider 232. The third party service provider then may call the recommendations service 224 with the recommendation request, for example, where the third party service provider has information that user 1 uses ecosystem 202 (e.g. by information shared between ecosystem 202 and third party service provider 232 upon user authorization). Recommendations service 224 may determine other similar users to user 1 that are also users of third party service provider 1, and return information on those users to third party service provider 232. The third party service provider 232 then may determine products that the identified other users have bought, rated highly, or otherwise interacted with, and recommend those products to user 1.

Figure 3:
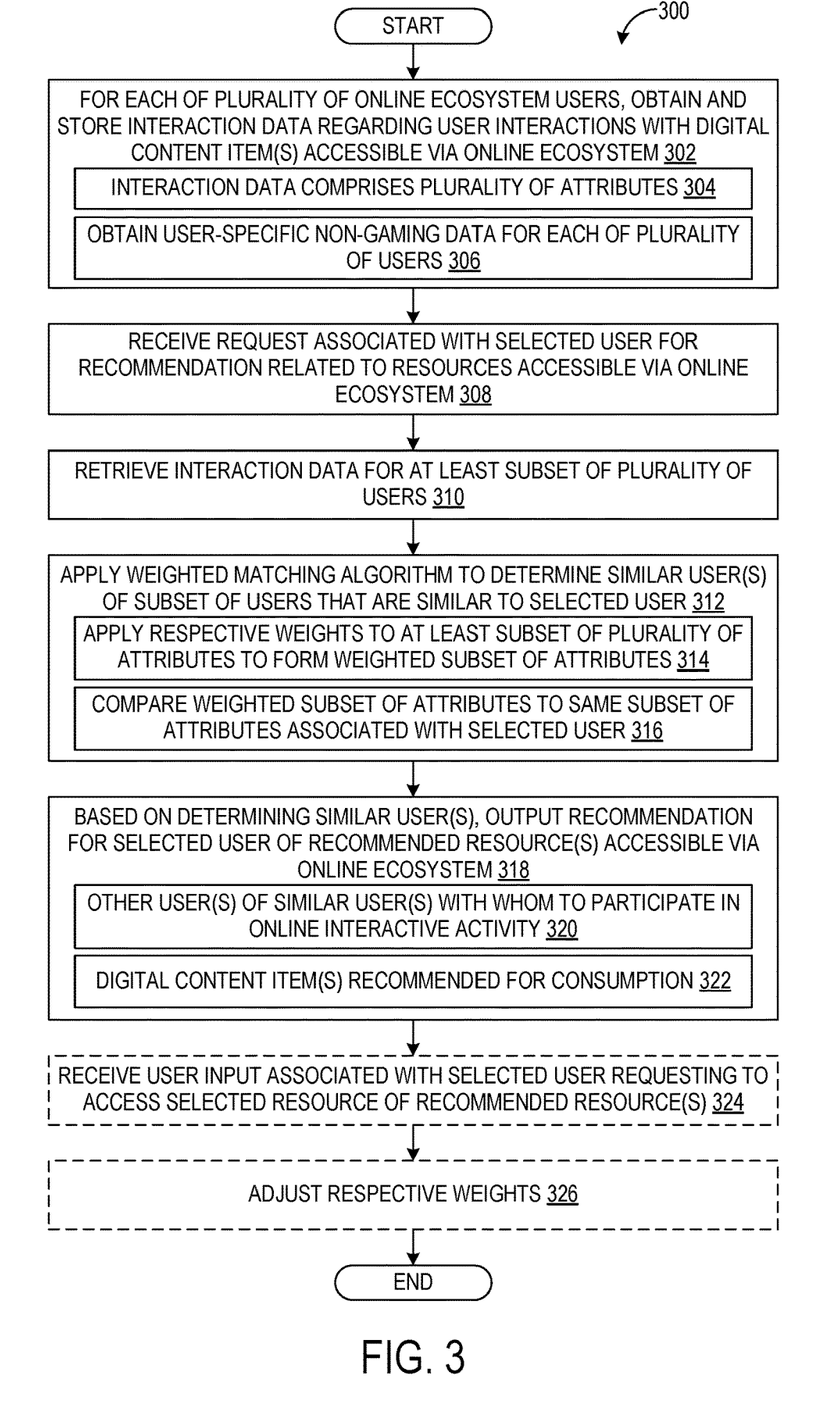
FIG. 3 shows a flow diagram depicting an example method of providing recommendations based upon interactions of users with resources of an ecosystem.

FIG. 3 shows a flowchart illustrating a method 300 of outputting at a computing system resource recommendations for users of an online ecosystem. Method 300 may be implemented as instructions in recommendation module 226 and executed on computing system 224, both of FIG. 2, for example. As such, references to FIG. 2 are made throughout the description of method 300.

At 302, method 300 comprises, for each of a plurality of users of the online ecosystem, obtaining and storing interaction data regarding interactions of the user with one or more digital content items accessible via the online ecosystem. The plurality of users may be the plurality of users 204 of ecosystem 202, for example, and the interaction data may be interaction data 222 regarding interactions with one or more digital content items of digital content 220. As indicated at 304, the interaction data may comprise, for each of the plurality of users, a plurality of attributes. The plurality of attributes may comprise gaining-related data, social-related data, non-gaming data, and/or other suitable data. For example, the plurality of attributes may comprise data indicating, for a given user, one or more preferred or favorite multimedia genres, content items, and/or artists. As such, obtaining and storing the interaction data may comprise obtaining user-specific non-gaining data for each of the plurality of users as indicated at 306. The non-gaming data may comprise user-related data such as location, age group, profession, and/or other suitable data, for example.

At 308, method 300 comprises, receiving a request associated with a selected user for a recommendation related to resources accessible via the online ecosystem. The request may originate at a computing device (e.g., computing device 206) associated with the selected user (e.g., in response to user selection of a control selectable to send the request such as control 106 of FIGS. 1A-1B), at the online ecosystem, at a third party service provider (e.g., service provider 232) communicatively coupled to the computing system issuing the request on behalf of the selected user, and/or at any other suitable location.

At 310, method 300 comprises retrieving, for at least a subset of users of the plurality of users, the interaction data. The subset of users may be selected in any suitable manner. For example, the subset may be selected according to one or more attributes of the selected user and/or subset of users (e.g., by identifying attributes that are shared), and/or by clustering users of the plurality of users.

At 312, method 300 comprises applying a weighted matching algorithm to determine one or more similar users of the subset of users that are similar to the selected user. As indicated at 314, applying the weighted matching algorithm may comprise applying respective weights to at least a subset of the plurality of attributes to form a weighted subset of attributes. The subset of the plurality of attributes and weights may be selected in any suitable manner. For example, the subset of the plurality of attributes and/or weights may be selected or influenced by user input. As further examples, the subset of the plurality of attributes and/or weights may be selected by the computing system and/or online ecosystem, and may potentially be selected according to the context of resource recommendation. As indicated at 316, applying the weighted matching algorithm may comprise comparing the weighted subset of attributes to a same subset of attributes associated with the selected user. Comparing the weighted subset of attributes to the same subset of attributes associated with the user may comprise performing substring comparisons between corresponding attribute pairs, for example.

At 318, method 300 comprises, based at least in part on determining the one or more similar users via the weighted matching algorithm, outputting a recommendation for the selected user of one or more recommended resources accessible via the online ecosystem. As indicated at 320, the recommendation may comprise one or more recommended other users with whom to participate in an online interactive activity, which may be presented individually and/or in groups (e.g., as illustrated in FIG. 1B), As indicated at 322, the recommendation may comprise one or more digital content items recommended for consumption (e.g., identified in interaction data associated with the one or more similar users). The recommendation may further comprise information indicating criteria on which the recommendation is based (e.g., in the form of tags 126 of FIG. 1B), and/or other suitable information. In some examples, the output of the recommendation may be based on criteria other than the determined one or more similar users.

At 324, method 300 may optionally comprise receiving a user input associated with the selected user requesting to access a selected resource of the one or more recommended resources, and at 326, adjust the respective weights in response. The user input may indicate an inclination of the selected user regarding the recommendation. Further, the user input may comprise a request to associate with (e.g., match with, message, and/or befriend) one or more recommended other users, and/or consume a digital content item. Adjusting the respective weights may comprise increasing the values of the respective weights, and/or using the request to inform subsequent recommendations (e.g., by applying the respective weights with or without adjustment in subsequent recommendations).

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
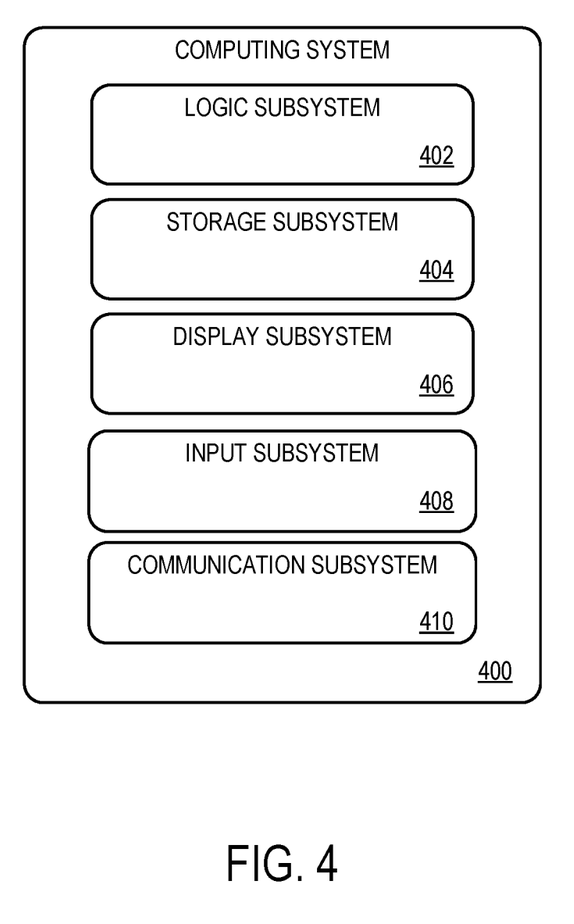
FIG. 4 shows a block diagram of an example computing device.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed e.g., to hold different data.

Storage machine 404 may include removable and/or built-in devices. Storage machine 404 may include optical memory (e.g., CD, DVD, HD-DVD, Blu-Ray Disc, etc.), semiconductor memory RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

Another example provides a computing system comprising a logic machine and a storage machine holding instructions executable by the logic machine to, for each of a plurality of users of an online ecosystem, obtain and store interaction data regarding interactions of the user with one or more digital content items accessible via the online ecosystem, receive a request associated with a selected user for a recommendation related to resources accessible via the online ecosystem, in response to receiving the request, retrieve, for at least a subset of users of the plurality of users, the interaction data, apply a weighted matching algorithm to determine one or more similar users of the subset of users that are similar to the selected user, and based at least in part on determining the one or more similar users via the weighted matching algorithm, output a recommendation for the selected user of one or more recommended resources accessible via the online ecosystem. In such an example, the one or more recommended resources alternatively or additionally may comprise one or more recommended other users of the one or more similar users with whom to participate in an online interactive activity. In such an example, the one or more recommended resources alternatively or additionally may comprise one or more digital content items recommended for consumption. In such an example, the interaction data alternatively or additionally may comprise, for each of the plurality of users, a plurality of attributes regarding the user, and the instructions alternatively or additionally may be executable to apply respective weights to at least a subset of the plurality of attributes to form a weighted subset of attributes, and compare the weighted subset of attributes to a same subset of attributes associated with the selected user. In such an example, the respective weights alternatively or additionally may be selected based at least in part on a user input associated with the selected user. In such an example, the instructions alternatively or additionally may be executable to receive a user input associated with the selected user requesting to access a selected resource of the one or more recommended resources, and in response adjust the respective weights. In such an example, the instructions alternatively or additionally may be executable to update the interaction data. In such an example, the subset of the plurality of users alternatively or additionally may belong to a cluster of the plurality of users that share an attribute with the selected user. In such an example, the one or more digital content items alternatively or additionally may comprise a multimedia content item and/or an application. In such an example, the instructions executable to obtain the interaction data alternatively or additionally may be executable to obtain user-specific non-gaming data for each of the plurality of users.

Another example provides a computing system comprising a logic machine and a storage machine holding instructions executable by the logic machine to, for each of a plurality of users of an online gaming service, obtain and store interaction data regarding interactions of the user with one or more digital content items accessible via the online gaming service, receive a request associated with a selected user for a recommendation related to resources accessible via the online gaming service, in response to receiving the request, retrieve, for at least a subset of users of the plurality of users, the interaction data, apply a weighted matching algorithm to determine one or more similar users of the subset of users that are similar to the selected user, and based at least in part on determining the one or more similar users via the weighted matching algorithm, output a recommendation for the selected user of one or more recommended resources accessible via the online gaming service. In such an example, the request associated with the selected user alternatively or additionally may be a request for matchmaking with one or more recommended other users of the one or more similar users, and the one or more recommended resources alternatively or additionally may comprise the one or more recommended other users with whom to participate in an online game. In such an example, the one or more recommended resources alternatively or additionally may comprise one or more games. In such an example, the interaction data alternatively or additionally may comprise, for each of the plurality of users, a plurality of attributes regarding the user, and the instructions alternatively or additionally may be executable to apply respective weights to at least a subset of attributes of the interaction data retrieved to form a weighted subset of attributes, and compare the weighted subset of attributes to a same subset of attributes associated with the selected user. In such an example, the instructions alternatively or additionally may be executable to receive a user input associated with the selected user requesting to associate with one or more recommended other users of the one or more similar users, and in response adjust the respective weights. In such an example, the instructions alternatively or additionally may be executable to update the interaction data. In such an example, the subset of the plurality of users alternatively or additionally may belong to a cluster of the plurality of users that share an attribute with the selected user. In such an example, the instructions executable to obtain the interaction data alternatively or additionally may be executable to obtain user-specific non-gaining data for each of the plurality of users.

Another example provides, on a computing system, a method comprising for each of a plurality of users of an online ecosystem, obtaining and storing interaction data regarding interactions of the user with one or more digital content items accessible via the online ecosystem, receiving a request associated with a selected user for a recommendation related to resources accessible via the online ecosystem, in response to receiving the request, retrieving, for at least a subset of users of the plurality of users, the interaction data, applying a weighted matching algorithm to determine one or more similar users of the subset of users that are similar to the selected user, based at least in part on determining the one or more similar users via the weighted matching algorithm, outputting a recommendation for the selected user of one or more recommended resources accessible via the online ecosystem, and receive a user input associated with the selected user, the user input indicating an inclination of the selected user regarding the recommendation, and in response adjust one or more weights used to apply the weighted matching algorithm. In such an example, the interaction data alternatively or additionally may comprise, for each of the plurality of users, a plurality of attributes regarding the user, and the instructions alternatively or additionally may be executable to apply respective weights to at least a subset of the plurality of attributes to form a weighted subset of attributes, and compare the weighted subset of attributes to a same subset of attributes associated with the selected user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a logic machine; and
a storage machine holding instructions executable by the logic machine to,
for each of a plurality of users of an online ecosystem, obtain, via a computer network, and store, at a data store, interaction data regarding interactions of the user with one or more digital content items accessible via the online ecosystem;
receive, from a computing device, a request associated with a selected user for a recommendation related to resources accessible via the online ecosystem;
in response to receiving the request,
retrieve, from the data store, for at least a subset of users of the plurality of users, the interaction data;
apply, at the computing system, a weighted matching algorithm to determine one or more similar users of the subset of users that are similar to the selected user; and
based at least in part on determining the one or more similar users via the weighted matching algorithm, output, from the computing system, a recommendation for the selected user of one or more recommended resources accessible via the online ecosystem.

2. The computing system of claim 1, wherein the one or more recommended resources comprises one or more recommended other users of the one or more similar users with whom to participate in an online interactive activity.

3. The computing system of claim 1, wherein the one or more recommended resources comprises one or more digital content items recommended for consumption.

4. The computing system of claim 1, wherein the interaction data comprises, for each of the plurality of users, a plurality of attributes regarding the user, and wherein the instructions are executable to
apply respective weights to at least a subset of the plurality of attributes to form a weighted subset of attributes; and
compare the weighted subset of attributes to a same subset of attributes associated with the selected user.

5. The computing system of claim 4, wherein the respective weights are selected based at least in part on a user input associated with the selected user.

6. The computing system of claim 4, wherein the instructions are further executable to receive a user input associated with the selected user requesting to access a selected resource of the one or more recommended resources, and in response adjust the respective weights.

7. The computing system of claim 1, wherein the instructions are further executable to update the interaction data.

8. The computing system of claim 1, wherein the subset of the plurality of users belongs to a cluster of the plurality of users that share an attribute with the selected user.

9. The computing system of claim 1, wherein the one or more digital content items comprise a multimedia content item and/or an application.

10. The computing system of claim 1, wherein the instructions executable to obtain the interaction data are executable to obtain user-specific non-gaming data for each of the plurality of users.

11. A computing system, comprising:
a logic machine; and
a storage machine holding instructions executable by the logic machine to,
for each of a plurality of users of an online gaming service, obtain, via a computer network, and store, at a data store, interaction data regarding interactions of the user with one or more digital content items accessible via the online gaming service;
receive, from a computing device, a request associated with a selected user for a recommendation related to resources accessible via the online gaming service;
in response to receiving the request,
retrieve, from the data store, for at least a subset of users of the plurality of users, the interaction data;
apply, at the computing system, a weighted matching algorithm to determine one or more similar users of the subset of users that are similar to the selected user; and
based at least in part on determining the one or more similar users via the weighted matching algorithm, output, from the computing system, a recommendation for the selected user of one or more recommended resources accessible via the online gaming service.

12. The computing system of claim 11, wherein the request associated with the selected user is a request for matchmaking with one or more recommended other users of the one or more similar users, and wherein the one or more recommended resources comprises the one or more recommended other users with whom to participate in an online game.

13. The computing system of claim 11, wherein the one or more recommended resources comprises one or more games.

14. The computing system of claim 11, wherein the interaction data comprises, for each of the plurality of users, a plurality of attributes regarding the user, and wherein the instructions are executable to
apply respective weights to at least a subset of attributes of the interaction data retrieved to form a weighted subset of attributes; and
compare the weighted subset of attributes to a same subset of attributes associated with the selected user.

15. The computing system of claim 14, wherein the instructions are further executable to receive a user input associated with the selected user requesting to associate with one or more recommended other users of the one or more similar users, and in response adjust the respective weights.

16. The computing system of claim 11, wherein the instructions are further executable to update the interaction data.

17. The computing system of claim 11, wherein the subset of the plurality of users belongs to a cluster of the plurality of users that share an attribute with the selected user.

18. The computing system of claim 11, wherein the instructions executable to obtain the interaction data are executable to obtain user-specific non-gaming data for each of the plurality of users.

19. On a computing system, a method, comprising:
for each of a plurality of users of an online ecosystem, obtaining, via a computer network and storing, at a data store, interaction data regarding interactions of the user with one or more digital content items accessible via the online ecosystem;
receiving, from a computing device, a request associated with a selected user for a recommendation related to resources accessible via the online ecosystem;
in response to receiving the request,
retrieving, from the data store, for at least a subset of users of the plurality of users, the interaction data;
applying, at the computing system, a weighted matching algorithm to determine one or more similar users of the subset of users that are similar to the selected user;
based at least in part on determining the one or more similar users via the weighted matching algorithm, outputting, from the computing system, a recommendation for the selected user of one or more recommended resources accessible via the online ecosystem; and
receive, from the computing device, a user input associated with the selected user, the user input indicating an inclination of the selected user regarding the recommendation, and in response adjust, at the computing system, one or more weights used to apply the weighted matching algorithm.

20. The method of claim 19, wherein the interaction data comprises, for each of the plurality of users, a plurality of attributes regarding the user, and wherein the instructions are executable to
apply respective weights to at least a subset of the plurality of attributes to form a weighted subset of attributes; and
compare the weighted subset of attributes to a same subset of attributes associated with the selected user.

* * * * *